United States Patent

Hara et al.

[11] Patent Number: 5,585,061
[45] Date of Patent: Dec. 17, 1996

[54] METHOD FOR PRODUCING A MULTILAYER MOLDED ARTICLE

[75] Inventors: Takahisa Hara, Kawanishi; Masahito Matsumoto, Osaka; Hitoshi Nakada, Kibi-gun, all of Japan

[73] Assignee: Sumitomo Chemical Co., Ltd., Okayama, Japan

[21] Appl. No.: 432,722

[22] Filed: May 2, 1995

Related U.S. Application Data

[62] Division of Ser. No. 267,768, Jul. 5, 1994, which is a continuation of Ser. No. 955,755, Dec. 24, 1992, abandoned.

[30] Foreign Application Priority Data

Apr. 25, 1991 [JP] Japan .................... 3-095265

[51] Int. Cl.$^6$ .................... B29C 43/18; B29C 43/20
[52] U.S. Cl. .................... 264/259; 264/321
[58] Field of Search .................... 264/259, 46.4, 264/321

[56] References Cited

U.S. PATENT DOCUMENTS

| | | | |
|---|---|---|---|
| 3,954,537 | 5/1976 | Alfter et al. . | |
| 4,719,278 | 1/1988 | Wellner et al. . | |
| 4,769,278 | 9/1988 | Kamimura et al. | 428/282 |
| 4,873,045 | 10/1989 | Fujita et al. | 264/259 |
| 5,053,179 | 10/1991 | Masui et al. . | |
| 5,154,872 | 10/1992 | Masui et al. . | |
| 5,252,269 | 10/1993 | Hara et al. | 264/328.7 |
| 5,281,376 | 1/1994 | Hara et al. | 264/328.7 |
| 5,292,465 | 3/1994 | Kobayashi et al. | 264/328.7 |

FOREIGN PATENT DOCUMENTS

| | | |
|---|---|---|
| 0466179 | 1/1992 | European Pat. Off. . |
| 0480153 | 4/1992 | European Pat. Off. . |
| 4030964 | 4/1992 | Germany . |

*Primary Examiner*—Allan R. Kuhns

[57] ABSTRACT

A multilayer molded article is produced using a composite skin layer made of a skin material and a foam sheet on a core layer of a thermoplastic resin in which a tensile modulus E of the skin material is not larger than 950 kg/cm$^2$, and a tensile modulus E (kg/cm$^2$), a heat shrinkage factor F (%) and a thickness t (cm) of the skin material satisfy the following relationship:

$$20/(E \times t) + F \geq 2.5,$$

which method produces a large size multilayer molded article having a complicated shape and no wrinkles, breakage or uneven marks in the skin material on the surface of the article.

5 Claims, 1 Drawing Sheet

METHOD FOR PRODUCING A MULTILAYER MOLDED ARTICLE

This application is a divisional of application Ser. No. 08/267,768 filed Jul. 5, 1994 which is a Rule 62 Continuation of Ser. No. 07/955,755, filed on Dec. 24, 1992, now abandoned, the entire contents of which are hereby incorporated by reference.

BACKGROUND OF THE INVENTION

1. Field of the Invention

The present invention relates to a method for producing a multilayer molded article including the step of laminating a composite skin layer which has been beforehand formed from a skin material and a foam sheet and a core layer of a thermoplastic resin, and a multilayer molded article produced by this method.

2. Description of the Related Art

Several different plastic molded articles are used in various fields including automobiles and domestic electric appliances in view of its economy, free moldability and light weight. With the increase in diversification of plastic applications, so has the need for variations in the appearance of the products. In particular, in these years, it has been strongly desired to impart a decorative effect and soft feeling to plastic molded products. Hitherto, many studies have been made to provide a compound which functions to satisfy such desires. However, it is difficult for a single material to have the above described surface properties while maintaining free moldability and strength. At present, several materials having different functions are commonly combined to make multilayer molded articles.

Among the multilayer molded articles, a multilayer molded article having a foam layer between a core layer and a skin material is excellent in providing a soft feeling. Various types of such articles have been proposed.

Conventional methods for producing such multilayer molded articles include placing a composite skin layer having a skin material and a foam sheet between molds, supplying a molten resin when the molds are not closed and then closing the molds to obtain the multilayer molded article (see Japanese Patent Kokai Publication No. 235613/1989).

Although the above method has some industrial advantages when it is used to produce an article having a complicated shape such as an instrument panel of an automobile, the skin layer tends to suffer from breakages, wrinkles and debossing.

SUMMARY OF THE INVENTION

An object of the present invention is to solve the above problems of prior art apparatus and methods by providing a method for producing a multilayer molded article which has a good appearance without breakages, wrinkles or debossing in its skin layer.

As the result of an extensive study to achieve the above object, it has been found that, by use of a composite skin layer including a skin material which has specific properties before lamination, a multilayer molded article having a fairly good appearance is obtained even if the article is of a large size and a complicated shape. Accordingly, the present invention provides a method for producing a multilayer molded article comprising laminating a composite skin layer which is preformed from a skin material and a foam sheet on a core layer of a thermoplastic resin, characterized in that a tensile modulus E of said skin material of the composite skin layer is not larger than 950 kg/cm$^2$, and the tensile modulus E (kg/cm$^2$), heat shrinkage factor F (%) and thickness t (cm) of said skin material satisfy the following relationship:

$$20/(E \times t) + F \geq 2.5$$

DETAILED DESCRIPTION OF THE DRAWINGS

Figure 1A:
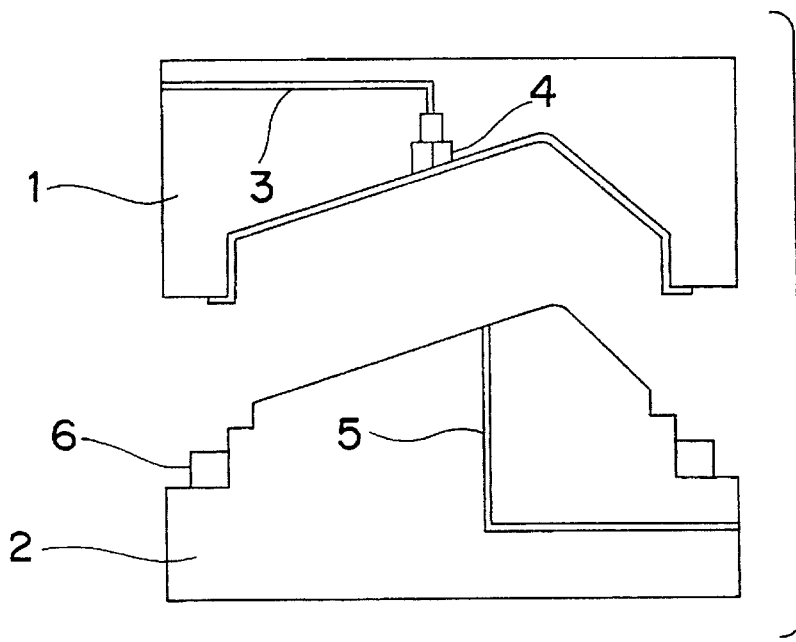
FIGS. 1A to 1C show cross sectional views of the molding apparatus in various steps of the molding method according to the present invention.

The thermoplastic resin to be used as the core layer according to the present invention is not limited and such that any conventional material presently used in compression molding, injection molding and extrusion molding may be used. Examples of the thermoplastic resin are thermoplastic resins such as polypropylene, polyethylene, polystyrene, acrylonitrile-styrene-butadiene copolymer and polyamide; and thermoplastic elastomers such as ethylene-propylene block copolymer and styrene-butadiene block copolymer. The thermoplastic resin containing an additive such as a filler (e.g. an inorganic filler or glass fibers), a pigment, a lubricant, an antistatic agent, and the like may be used.

The skin material which forms a part of the composite skin layer used in the present invention may be made of several different materials including sheets made of a thermoplastic resin (e.g. polyolefin, polyvinyl chloride, polyamide, etc.) and a thermoplastic elastomer (e.g. polyolefin, polyester, polystyrene, etc.). An embossed sheet is preferably used as a leather-like sheet.

The foam sheet which forms a part of the composite skin layer used in the present invention may also be made from a variety of materials. Exemplary foam sheets include those made of polypropylene foam, polyethylene foam, polyurethane foam and the like. A thickness of the foam sheet is preferably from 1.5 to 10 mm. When the thickness of the foam sheet is smaller than 1.5 mm, the cushioning property is insufficient, while when the thickness is larger than 10 mm, the cost performance is disadvantageous. An expansion ratio of the foam sheet is from 3 to 40. When the expansion ratio of smaller than 3, the cushioning property is insufficient. When the expansion ratio is larger than 40, the foam sheet is too soft.

In the present invention, the composite skin layer is preformed from the skin material and the foam sheet. For preforming the composite skin layer, the skin material and the foam sheet may be adhered with an adhesive or fusion bonded. In one example, an olefinic thermoplastic elastomer sheet is used as the skin material and a polypropylene foam sheet is used as the foam sheet. The olefinic thermoplastic elastomer sheet is produced using a T-die. One of a pair of rolls for nip cooling of the sheet form molten elastomer is embossed and the polypropylene foam sheet is supplied between the other roll and the molten elastomer, whereby the composite skin layer which has an embossed surface is lined with the polypropylene foam sheet in one step.

To produce a multilayer molded article having a complicated form such as an instrument panel, in general, the produced composite skin layer is premolded by conventional thermoforming. In this case, preferably, the mold used in the premolding has a shape such that the inner surface shape of a female mold used in the press molding conforms to the shape of the outer surface of the premolded composite skin layer.

The multilayer molded article of the present invention is produced by positioning the composite skin layer between upper and lower molds, supplying the resin melt between the foam sheet of the composite skin layer and either one of the molds, closing the molds and pressing and cooling the molds. One of the important factors in the present invention is that the composite skin layer comprises the skin material having, before being contacted to the resin melt, a tensile modulus E of not larger than 950 kg/cm$^2$, and a tensile modulus E (kg/cm$^2$), heat shrinkage factor F (%) and thickness t (cm) which satisfy the following relationship $$\frac{20}{(E \times t)} + F \geq 2.5; \text{ and.}$$

The composite skin layer can be prepared by bonding the skin material which satisfies all of the above discussed requirements to the foam sheet, for example, with an adhesive, or laminating a skin material which does not originally satisfy the above requirements of the foam sheet and thermoforming the laminate to impart heat history to the skin material. Among the above preparation methods, in the former one, since it is difficult to purchase a skin material which satisfies all of the above requirements, the skin's properties are adjusted by selecting compositions or components of a conventional skin material, then heating the skin material and afterwards cooling it down to room temperature, or heating the skin material in an expanded state and then cooling it, or controlling its thickness. However, such methods require the pretreatment of the skin material. Therefore, the latter method, that is, the premolding method comprising laminating the skin material which does not originally satisfy the above requirements on the foam sheet and thermoforming the laminate, is preferred. Needless to say, a skin material which does not satisfy any of the above requirements after the above pretreatment is not suitable for the production a multilayer molded article according to the present invention.

The tensile modulus of the skin material is measured according to JIS K7113 using a No. 2 test sample at a pulling rate of 200 mm/min. The heat shrinkage factor is calculated from a size change before and after keeping the skin material in an oven at 80° C. for 5 minutes and maintaining it at room temperature for 12 hours. In the case of the skin material which is composited in the premolded composite skin layer, the properties are measured with the skin material after removing the foam sheet.

The multilayer molded article of the present invention is produced by positioning the composite skin layer between open upper and lower molds, supplying a resin melt between the foam sheet of the composite skin layer and either one of the molds, closing the molds and pressing and cooling the molds. In the method of the present invention, to avoid damaging the composite skin layer, the timing of supplying the resin melt and closing the mold are important. Preferably, the resin melt is supplied through a resin passage formed in one of either the upper or lower molds at a mold closing rate of 30 mm/sec. or less, when the cavity clearance between the upper and lower molds is from (C+5) mm to (C+100) mm (where C is the cavity clearance at the completion of the molding). Thereafter, the molds continue closing until the clearance reaches C mm. The composite skin layer is pressed and cooled for a determined time, whereby the desired multilayer molded article is produced.

EXAMPLES

The present invention will be further described using the following Examples, which are given for purposes of illustration only and are not intended to limit the scope of the present invention.

EXAMPLE 1

Figure 1B:
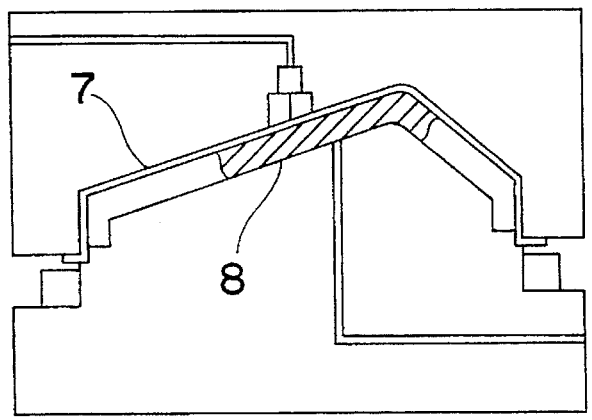
Figure 1C:
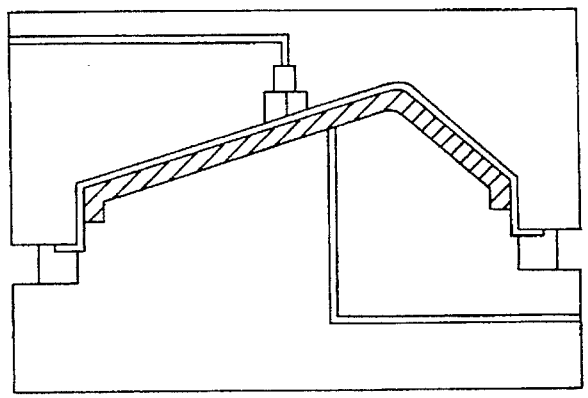

The molding operation is performed using a vertical pressing machine having a clamping force of 200 tons to which molds for producing an instrument panel having a length of 1500 mm were attached as shown in FIG. 1.

A skin material, is used having an embossed polyvinyl chloride sheet having a thickness of 0.7 mm (manufactured by Kyowa Leather Co., Ltd.) On the skin material, a polypropylene foam sheet having a thickness of 3.0 mm and an expansion ratio of 15 times (PPSM 15030 manufactured by TORAY CO., LTD.) was bonded with an adhesive. Using a far infrared heater, the composite sheet was heated to 160° C. on the skin material surface and 135° C. on the polypropylene foam sheet surface. Then, the lower mold was lifted and the polypropylene foam sheet side of the composite skin layer was drawn onto the lower mold using vacuum suction holes disposed its surface. The composite skin layer was then cooled with a fan to finish premolding. At this time, the polyvinyl chloride sheet after removing the polypropylene foam sheet had a tensile modulus of 244 kg/cm$^2$ and a heat shrinkage factor of 1.49. This composite skin layer premolded by thermoforming was used.

Polypropylene (SUMITOMO NOBLEN BP 697 K manufactured by Sumitomo Chemical Co., Ltd.; a melt flow index of 30 g/min.) was used as a thermoplastic resin. It was heated and supplied in the molds for molding. The upper and lower molds were heated to 30° C. and 40° C., respectively.

The composite skin layer 7 which had been positioned between the upper and lower molds 1 and 2 was drawn on the surface of the upper mold 1 using a vacuum suction hole 3.

The upper mold 1 was lowered at a rate of 200 mm/sec. When the cavity clearance between the upper and lower molds reached 70 mm, the lowering rate of the upper mold 1 was decreased to 6 mm/sec. and simultaneously, the resin melt 6 was heated until molten at 200° C. and supplied between the foam sheet side of the composite skin layer 7 and the lower mold 2 through a resin passage 5 which is provided in the lower mold. When the cavity clearance reached 40 mm, the supply of the resin melt was finished. As the upper mold 1 was further lowered, the resin melt 8 flowed between the composite skin layer 7 and the surface of the lower mold until it reached the edges of the cavity filling the mold cavity. The molds were pressed and cooled for 40 seconds and the upper mold 1 was lifted up. The desired molded article was removed yielding a multilayer molded article having no wrinkles, breakage or uneven marks on the surface.

EXAMPLES 2 AND 3

Under the same conditions as in Example 1 except that a polyvinyl chloride sheet shown in Table 1 was used as a skin material, the molding operation was performed. As in Example 1, the multilayer molded article produced which was covered with the embossed skin material had no wrinkles, breakage or uneven marks.

COMPARATIVE EXAMPLES 1, 2 AND 3

Under the same conditions as in Example 1 except that a polyvinyl chloride sheet shown in Table 1 was used as a skin material, the molding operation was performed. Different from the molded articles produced in Examples 1–3, the multilayer molded article had a poor appearance with uneven marks wrinkles and breakage.

TABLE 1

| Example No. | Thickness (mm) | Skin material | | | | 20/ET + F | Surface appearance of the molded article |
| --- | --- | --- | --- | --- | --- | --- | --- |
| | | Raw material | | After premolding | | | |
| | | Tensile modulus (kg/cm$^2$) | Heat shrinkage factor (%) | Tensile modulus (kg/cm$^2$) | Heat shrinkage factor (%) | | |
| 1 | 0.7 | 231 | 0.37 | 244 | 1.49 | 2.66 | O |
| 2 | 0.7 | 164 | 0.47 | 160 | 1.23 | 3.02 | O |
| 3 | 0.7 | 187 | 0.25 | 140 | 2.30 | 4.34 | O |
| C. 1 | 0.7 | 963 | 0.05 | 870 | 0.88 | 1.21 | X |
| C. 2 | 0.7 | 463 | 0.66 | 499 | 0.36 | 0.93 | X |
| C. 3 | 0.7 | 199 | 0.86 | 195 | 0.58 | 2.05 | X |

According to the present invention, it is possible to produce a multilayer molded article having a good appearance with no wrinkles, breakage or uneven marks in the skin material on the molded article surface, even when molding a large and complicated shaped article.

What is claimed is:

1. A method for producing a multilayer molded article comprising:

preforming a composite skin layer from a skin material and a foam sheet, the skin material with a tensile modulus E less than or equal to 950 kg/cm$^2$, and wherein the tensile modulus E (kg/cm$^2$), the heat shrinkage factor F (%) and the thickness t (cm) of said skin material satisfy the following relationship:

$$20/(E \times t) + F \geq 2.5$$

positioning the composite skin layer between upper and lower mold portions;

supplying a resin melt between the foam sheet of the composite skin layer and one of the upper and lower mold portions;

closing the upper and lower mold portions against the composite skin layer and resin melt; and cooling the upper and lower mold portions.

2. The method for producing a multilayer molded article as recited in claim 1, wherein said preforming step further comprises bonding the skin material to said foam sheet with an adhesive.

3. The method for producing a multilayer molded article as recited in claim 1, wherein said preforming step further comprises bonding the skin material to said foam sheet by fusion bonding.

4. The method for producing a multilayer molded article as recited in claim 1, wherein said preforming step further comprises premolding said composite skin layer by thermoforming.

5. The method for producing a multilayer molded article as recited in claim 1, further comprising the step of pretreating said skin material, prior to said preforming step, by heating and cooling the skin material such that the skin material has a tensile modulus E not larger than 950 kg/cm$^2$, and the tensile molulus E (kg/cm$^2$), heat shrinkage factor F (%) and thickness t (cm) of said skin material satisfy the following relationship:

$$20/(E \times t) + F \geq 2.5.$$

* * * * *

UNITED STATES PATENT AND TRADEMARK OFFICE
CERTIFICATE OF CORRECTION

PATENT NO.  : 5,585,061
DATED       : Dec. 17, 1996
INVENTOR(S) : Takahisa HARA et al.

It is certified that error appears in the above-indentified patent and that said Letters Patent is hereby corrected as shown below:

In the "Related U.S. Application Data" section, please amend category "[62]" to read as follows:

-- [62] Division of Ser. No. 267,768, July 5, 1994 which is a continuation of Ser. No. 955,755, Dec. 24, 1992, which was the national stage of international application No. PCT/JP92/00547 filed April 27, 1992, abandoned. --

Signed and Sealed this

Seventh Day of October, 1997

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,585,061
DATED : Dec. 17, 1996
INVENTOR(S) : Takahisa HARA et al.

It is certified that error appears in the above-indentified patent and that said Letters Patent is hereby corrected as shown below:

On the title page, item: [73] Assignee:" please change the Assignee information from "Sumitomo Chemical Co., Ltd., Okayama, Japan" to correctly read --Sumitomo Chemical Co., Ltd., Osaka, Japan and Suiryo Plastics Co., Ltd., Okayama, Japan-- .

Signed and Sealed this

Twenty-seventh Day of January, 1998

*Attest:*

BRUCE LEHMAN

*Attesting Officer*        *Commissioner of Patents and Trademarks*